United States Patent
Forguites et al.

(10) Patent No.: US 9,413,552 B2
(45) Date of Patent: Aug. 9, 2016

(54) INTERNET PROTOCOL ADDRESSING OF DEVICES EMPLOYING THE NETWORK RING TOPOLOGY

(71) Applicant: ROCKWELL AUTOMATION TECHNOLOGIES, INC., Mayfield Heights, OH (US)

(72) Inventors: Jessica E. Forguites, Willoughby Hills, OH (US); Sivaram Balasubramanian, Solon, OH (US); Mark G. Devonshire, Chagrin Falls, OH (US); Mark R. Hantel, Medina, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 149 days.

(21) Appl. No.: 14/446,905

(22) Filed: Jul. 30, 2014

(65) Prior Publication Data
US 2016/0036602 A1 Feb. 4, 2016

(51) Int. Cl.
*H04L 12/26* (2006.01)
*H04L 12/46* (2006.01)
*H04L 29/12* (2006.01)
*H04L 12/741* (2013.01)
*H04L 12/42* (2006.01)
(Continued)

(52) U.S. Cl.
CPC ............ *H04L 12/4637* (2013.01); *H04L 12/42* (2013.01); *H04L 41/12* (2013.01); *H04L 45/74* (2013.01); *H04L 61/2015* (2013.01); *H04L 61/2038* (2013.01); *H04L 67/12* (2013.01); *H04W 80/04* (2013.01)

(58) Field of Classification Search
CPC ... H04L 12/433; H04L 45/48; H04B 10/0773
USPC .......................................... 370/404; 709/220
See application file for complete search history.

(56) References Cited

U.S. PATENT DOCUMENTS 5,084,863 A * 1/1992 Guezou ................. H04L 12/437
370/223
8,244,838 B2 8/2012 Balasubramanian et al.
(Continued)

FOREIGN PATENT DOCUMENTS

DE 10260640 A1 7/2004

OTHER PUBLICATIONS

Extended European Search Report; EP Application No. 15177870.1, Jan. 29, 2016.
(Continued)

*Primary Examiner* — Wanda Z Russell
(74) *Attorney, Agent, or Firm* — Boyle Fredrickson, S.C.

(57) ABSTRACT

Aspects of the present invention provide a ring supervisor operating as a server for maintaining and allocating addresses for devices in a ring topology. The ring supervisor may obtain an ordered list of devices in the ring by sending a data collection frame that passes through each device around the ring with each device appending its preconfigured address information. The ring supervisor may then operate to apply the addressing provided by each device, or alternatively, allocate different addresses to each device from a separate pool. As a result, control program software for ring devices can be developed using a general pool of addresses without requiring specific knowledge of actual addresses. Also, if a device requires replacement, the device may be replaced without requiring modification to the control program to provide the address for the replacement device.

20 Claims, 5 Drawing Sheets

(51) Int. Cl.
*H04L 29/08* (2006.01)
*H04L 12/24* (2006.01)
*H04W 80/04* (2009.01)

(56) References Cited

U.S. PATENT DOCUMENTS

| | | | | |
|---|---|---|---|---|
| 2006/0062160 A1* | 3/2006 | Kim | ............... | H04L 61/1015 370/257 |
| 2008/0222275 A1* | 9/2008 | Yumoto | ............ | H04L 12/433 709/220 |
| 2010/0226260 A1* | 9/2010 | Zinjuvadia | ............ | H04L 45/48 370/248 |
| 2014/0143558 A1* | 5/2014 | Kuesel | .................. | G06F 1/26 713/300 |
| 2014/0153924 A1* | 6/2014 | deRuijter | ............ | H04B 10/0773 398/58 |

OTHER PUBLICATIONS

Anonymous; "DHCP Persistence in the Cell/Area Zone; Chapter 10 of Converged Plantwide Ethernet (CPwE) Design and Implementation Guide"; pp. 1-16; Sep. 9, 2011; Retrieved from the Internet: URL:http://WWW.cisco.com/c/en/us/td/docs/solutions/Verticals/CPwE/CPwe_DIG/CPwe_chapter10.pdf.

Anonymous; "Introduction to Device Level Ring, topology for EtherNet/IP"; Retrieved from the Internet: URL:http://www.emobility24.eu/index.php?id=6113&parentid=74&themeid=255&hft=52&showdetail=true&bb=1: pp. 1-8; May 1, 2009.

* cited by examiner

ND ADDRESSING OF
INTERNET PROTOCOL ADDRESSING OF DEVICES EMPLOYING THE NETWORK RING TOPOLOGY

BACKGROUND OF THE INVENTION

The present invention relates to industrial controllers, and in particular, to addressing of industrial controllers employing the network ring topology.

Networks used for communication among industrial controllers differ from standard networks in that they must operate to communicate data reliably within predefined time limits. Often this is accomplished by additional communication protocols that reserve network bandwidth and schedule messages to prevent collisions and the like that can introduce unpredictable delay into network communications.

Many computer networks also incorporate protocols to repair the network in the event of network node failure. Some protocols can take a relatively long time to reconnect the network (as much as 30 seconds) and thus are unacceptable for industrial control networks where the controlled process cannot be undirected during this period without disastrous consequences.

The risk of debilitating network failure in an industrial control can often be avoided using a redundant network topology, for example, where network nodes are connected in a ring with a supervisor. Normally the ring is opened at the supervisor node for all standard data and thus operates in a normal linear topology. The supervisor may send out test "telegram" or "beacon" frames in one direction on the ring which are received back at the supervisor in the other direction to indicate the integrity of the ring. If the ring is broken, such as by a node or media failure, the supervisor joins the ends of the ring to produce once again a continuous linear topology now separated by the failed component. Changes in the mode of operation of the supervisor from "separated" to "joined" may be transmitted to the other nodes using notification frames so that these nodes can rebuild their MAC address routing tables used to associate a port with a destination address.

The error detection time of such ring systems can be quite fast, limited principally by the transmission rate of the beacons (every several microseconds). This rate defines the maximum time before which an error is detected and the ring may be reconfigured. As described in U.S. Pat. No. 8,244,838, which reference is hereby incorporated by reference in its entirety, even faster recovery time can be achieved by communicating the topology change in the beacon frame itself, along with monitoring reception or non-reception of beacon frames in ring nodes.

While device level ring topologies provide distinct advantages for industrial control systems, addressing knowledge for ring participants is typically required for the control program software to be implemented before the system can be commissioned. This results in inflexibilities in implementing the system. In addition, if an existing industrial control system configured in a ring requires replacement of one or more ring participants, the control program typically also requires modification with respect to addressing for the one or more replacement devices. This can result in increased complexity for replacement in the field which may, in turn, result in increased costly downtime of the system. A need therefore exists to provide an industrial control system having the advantages of a device level ring topology while minimizing the aforementioned drawbacks.

SUMMARY OF THE INVENTION

The present inventors have recognized that by implementing a ring supervisor to operate as a server for maintaining and allocating addresses for devices in the ring, a device level ring topology may be provided which significantly lessens the need for addressing knowledge prior to commissioning or replacement. The ring supervisor may obtain an ordered list of devices in the ring by sending a data collection frame that passes through each device around the ring with each device appending its preconfigured address information. Accordingly, the ring supervisor may operate to apply the addressing provided by each device, or alternatively, allocate different addresses to each device from a separate pool.

As a result, control program software for ring devices can be developed using a general pool of addresses without requiring specific knowledge of the actual addresses for the ring participants to be commissioned in the ring. Also, if a device in the ring requires replacement, the device may be replaced without requiring modification to the control program to provide the address for the replacement device.

In accordance with an embodiment, a ring network may comprise a plurality of switching nodes providing Layer 2 functionality to forward data frames between ports, each switching node having at least a first and second port connectable to network media, the switching nodes arranged in a network ring wherein the first and second ports of each switching node connect to different switching nodes of the network ring and wherein at least one of the switching nodes is an active ring supervisor and the other switching nodes are ring devices. The active ring supervisor may executes to: (a) transmit a data collection frame out of one port for traversing the ring, wherein the data collection frame transmits through each device on the ring in an order in which they are connected, and wherein each device provides at least one of its MAC address and its IP address to the active ring supervisor in response to the data collection frame; and (b) maintain a data structure listing each device on the ring, wherein the data structure indicates the order in which each device is connected on the ring, and wherein the data structure indicates the at least one of a MAC address and an IP address for each device.

The active ring supervisor may operate as a Dynamic Host Configuration Protocol (DHCP) server and execute to allocate an IP address to each device on the ring.

Upon a change of one or more targeted devices in the ring, the active ring supervisor may transmit a second data collection frame and compare the data structure to an updated data structure resulting from the second data collection frame.

Following the compare, upon determining a same number of devices in the ring and a same ordering of devices in the ring with only the one or more targeted devices changed to one or more different devices, the active ring supervisor reallocates each IP address from the one or more targeted devices to the one or more different devices.

Following the compare, upon determining at least one of a different number of devices in the ring and a different ordering of devices in the ring, the active ring supervisor sends an alert message warning of the change to the user.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 1:
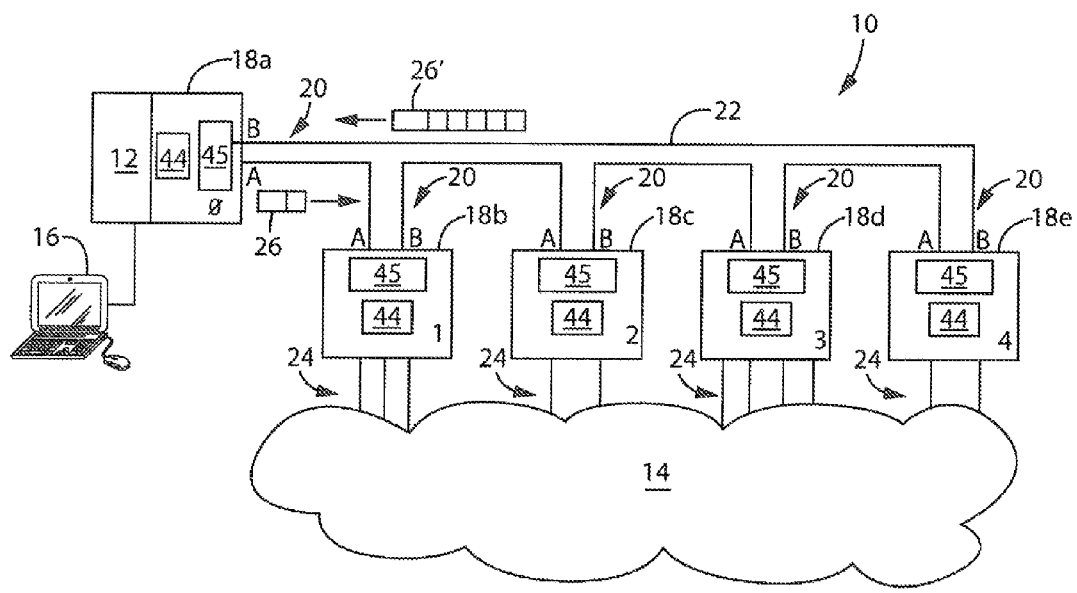
FIG. 1 is a diagram of an industrial control network configured for use in accordance with an embodiment of the invention.

Referring now to FIG. 1, an exemplar industrial control network 10 is provided in a device level ring topology similar to the industrial control network described in U.S. Pat. No. 8,244,838, which reference is hereby incorporated by reference in its entirety. The industrial control network 10 may include, for example, a programmable logic controller 12 executing a stored program to provide for real-time control of an industrial process 14. Real-time control, in this context, means control that is subject to well-defined maximum delay periods between an output signal generated by the programmable logic controller 12 and electrical signal sent to an actuator in the industrial process 14, and similarly well-defined maximum delay period between the generation of a signal by a sensor in the industrial process 14 and its receipt and processing by the programmable logic controller 12.

Normally the programmable logic controller 12 includes an electronic computer executing a program stored in a non-transient medium providing detailed logic for the necessary control. Often the stored program is generated uniquely for the particular industrial process 14.

The programmable logic controller 12 may communicate with a terminal device 16, or Human Machine Interface (HMI), that allows for the configuration of the industrial controller by a user, including the generation of the control program and the initialization of its components. The programmable logic controller 12 may also communicate with a network node or ring device 18 (in this example active ring supervisor 18a) implementing protocols suitable for Ethernet or Internet Protocol (IP) or other control network protocols. The active ring supervisor 18a may be an Ethernet node having a processor 44, two ports 20 (labeled A and B respectively) and an embedded switching ASIC 45 to switch network traffic between two ports and a processor 44. In this example, the active ring supervisor 18a will provide for layer 2 protocol to implement a full/half duplex IEEE 802.3 Ethernet network.

Ports A and B each connect to network media 22, for example, copper conductors or fiber optic links having a bandwidth of at least 100 Mbps in full duplex mode. The media 22 may connect to other network nodes or ring devices 18b, 18c, 18d and 18e each also having a processor 44, two ports 20 (A and B) and a custom embedded switching ASIC 45 or a commercial embedded switching IC. The other ring devices 18 may also include ring protocol aware switches and/or ring protocol unaware commercial off-the-shelf ("COTS") managed switches, each with three or more ports with two ports connected to the ring and remaining ports connected to other single port or multi-port network nodes. The ring devices 18b-e may communicate with I/O circuits or other control devices providing signals along conductors 24 to and from the industrial process 14 for control thereof. Non-supervisory ring devices 18b-e may operate as back up ring supervisors.

During normal operation, one node (in this case node 18a) will operate as the active ring supervisor 18a (also termed active supervisory node) and in this capacity will send various types of frames from each of its ports 20.

The media 22 interconnects the ports 20 of the ring devices 18 to produce a ring topology, that is, one in which by following the media 22 one may arrive successively at each ring device 18 once passing through each of the ports A and B of each of the ring devices 18. The ring topology represents a physical connection and is independent of whether frames may actually pass through the ports A and B as may be prevented by failure of the media 22 or of one or more ring devices 18. A ring state may indicate whether the ends of the ring are open at the active ring supervisor 18a meaning that frames are not passed between ports A and B (open mode) or the ends of the ring are closed at the active ring supervisor 18a allowing frames to pass between ports A and B (closed mode).

The active ring supervisor 18a may transmit conventional Ethernet data frames carrying data fir the control of the industrial process 14. These data frames will be directed to particular ring devices 18 through a port A or B determined by an internal routing table constructed according to methods known in the art.

When the ring transitions to a normal mode of operation, and the ring is closed, the active ring supervisor 18a transmits a "Sign_On" data collection frame 26 out of one port, such as its unblocked port A, for traversing the ring. The data collection frame 26 transmits through each of the ring devices 18b-e on the ring in an order in which they are connected. Each of the ring devices 18b-e provides its address information, such as in the form of its MAC address, its IP address, or otherwise, to the active ring supervisor in response to the data collection frame, such as in the data collection frame as the frame transmits through the device. The data collection frame 26 eventually reaches back to the active ring supervisor 18a as data collection frame 26', such as through its blocked port B.

Figure 2A:
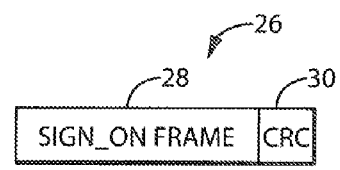
FIG. 2A is a depiction of the fields of a data collection frame for communicating in the ring.

Referring now to FIG. 2A, a depiction of the fields of the data collection frame 26 for communicating in the ring is provided in accordance with an embodiment of the invention. A first field 28 provides the "Sign_On" command frame which routes the command to each of the ring devices 18b-e. An optional Cyclic Redundancy Check (CRC) or other error handling field 30 may also be provided for ensuring data integrity for the data collection frame 26. As each of the ring devices 18b-e receive the data collection frame 26, each ring device 18 may append its preconfigured address information to the data collection frame 26 in the order in which the ring devices 18b-e are connected in the ring. Each of the ring devices 18b-e may also update the error handling field 30 as it passes the "Sign_On" command flame to the next ring device 18 with its appended data.

Figure 2B:
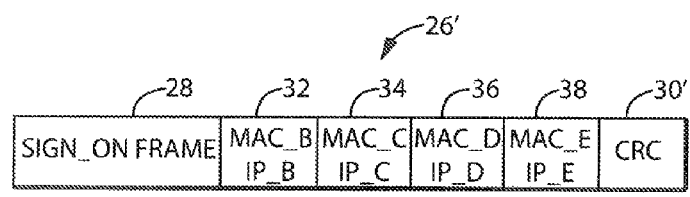
FIG. 2B is a depiction of the fields of the data collection frame providing an ordered list of devices and preconfigured address information, each in accordance with an embodiment of the invention.

Referring now to FIG. 2B, a depiction of the fields of the data collection frame 26' which provides an ordered list of ring devices 18 and corresponding preconfigured address information is provided in accordance with an embodiment of the invention. The data collection frame 26', as it reaches back to the active ring supervisor 18a, now includes ring device address fields 32, 34, 36 and 38 for each of the ring devices 18b, 18c, 18d and 18e, respectively. These address fields 32, 34, 36 and 38 are also provided in an order in which the data collection frame 26' passed through each of the ring devices 18b-e. These address fields 32, 34, 36 and 38 indicate for each respective network node a specific MAC address, a specific IP address, and/or any other specific networking or addressing parameters important for each respective ring device 18. If a device does not have an IP address assigned yet, the device will append a zero for its IP address. In addition, the error handling field 30' provides updated error handling for the data collection frame 26' along the way.

Figure 3:
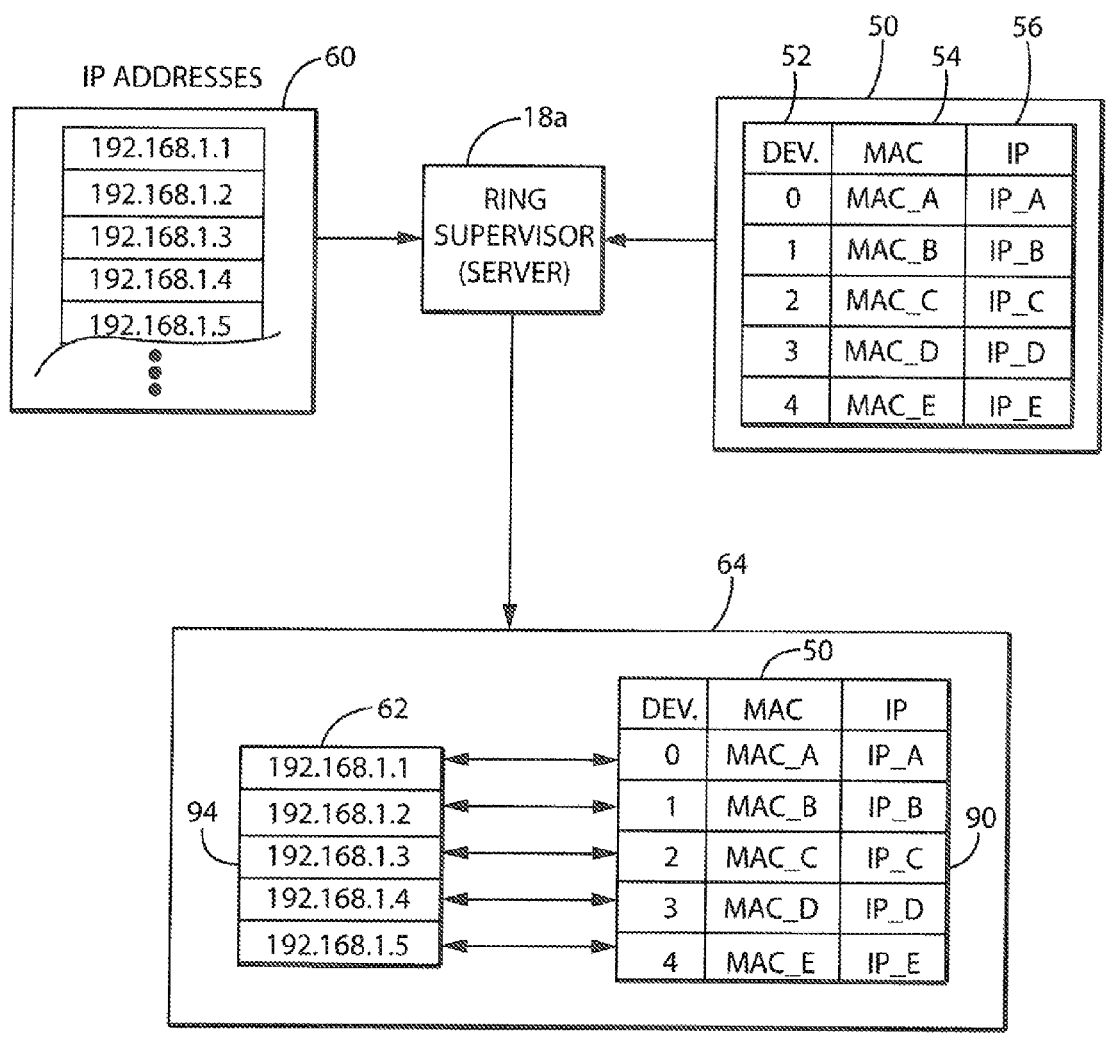
FIG. 3 is a diagram illustrating a ring supervisor allocating addresses to devices in the ring in accordance with an embodiment of the invention.

Referring now to FIG. 3, a diagram illustrating a ring supervisor allocating addresses to devices in the ring is provided in accordance with an embodiment of the invention. The active ring supervisor 18a maintains a data structure 50 listing each device on the ring. The data structure 50 indicates an order 52 in which each device is connected on the ring. The data structure 50 also indicates a specific MAC address 54, a specific IP address 56, and/or any other specific networking or addressing parameters important for each respective ring device 18. The active ring supervisor 18a may essentially derive the data structure 50 from the data collection frame 26'. The data structure 50, serving as an ordered participant list, may be available through a device level ring object interface of the active ring supervisor 18a. Accordingly, the data structure 50 can be used to assign IP addresses to the ring devices 18b-e or to learn assigned IP addresses of the ring devices 18b-e.

In an embodiment, to implement a dynamic address assignment scheme, the active ring supervisor 18a allocates an IP address to each device on the ring. The active ring supervisor 18a may reference a plurality of predetermined IP addresses 60 which may be provided, for example, by a user via the terminal device 16, and which may comprise one or more sequential ranges of predetermined IP addresses. The active ring supervisor 18a may then, in turn, operate as a Dynamic Host Configuration Protocol (DHCP) server and allocate an IP address from the predetermined IP addresses 60 to each of the ring devices 18b-e. The active ring supervisor 18a may allocate IP addresses to the ring devices 18b-e immediately or after a particular ring device 18 makes a request. Accordingly, the active ring supervisor 18a may use the data structure 50 for mapping devices on the ring to allocated IP addresses 62 to effectively produce a reference table 64 for the dynamic address assignment. In embodiments, the reference table 64 may simply be an extension of the data structure 50, or may be a separate data structure altogether.

In a preferred embodiment, the active ring supervisor 18a waits until the ring is closed and the data collection frame 26' is updated and complete before assigning IP addresses to the ring devices 18b-e. Any address requests received during the ring fault period and while waiting for the data collection frame 26' to update and complete may be dropped by the active ring supervisor 18a.

In another embodiment, to implement a manual or static address assignment scheme, the ring devices 18b-e may be manually configured with an address, such as through a static IP address switch mechanism provided by the ring device. Accordingly, the active ring supervisor 18a may simply apply the data structure 50, derived from the data collection frame 26', as a final mapping for the ring devices 18b-e.

Figures 4, 5A, 5B, 5C:
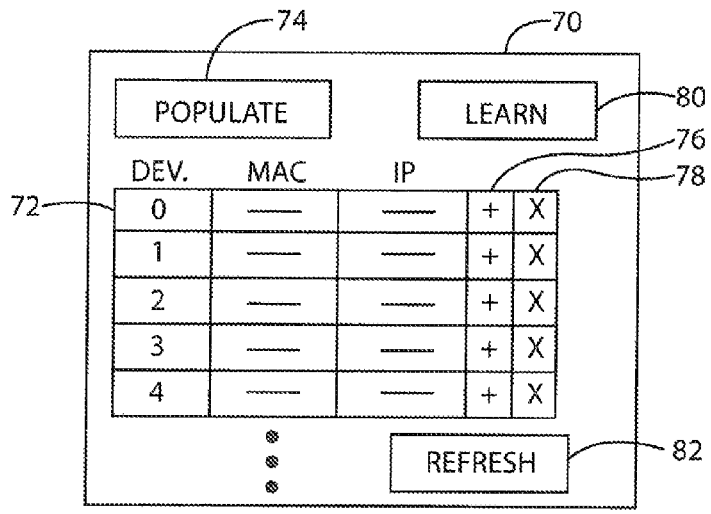
FIG. 4 is a user interface for viewing and configuring addresses in the ring in accordance with an embodiment of the invention.
FIG. 5A is a depiction of a data structure listing each device on the ring in which a device has been replaced.
FIG. 5B is a depiction of a data structure in which a device has been replaced and devices have been reordered.
FIG. 5C is a depiction of a data structure in which a device has been added, each in accordance with an embodiment of the invention.

Referring now to FIG. 4, a user interface 70 for viewing and configuring addresses in the ring is provided in accordance with an embodiment of the invention. The user interface 70 may appear on the terminal device 16 to effectively illustrate aspects of the data structure 50, such as in the form of an array 72. A user may press a "populate" button 74 on the user interface 70 to retrieve and populate an ordered list of MAC addresses, IP addresses and/or other addressing or networking parameters from the data structure 50 to the user interface 70. The user may then add, modify or delete information in the array 72 as may be needed to effect useful operation of the control network. For example, the user can insert new entries in various orders via a "+" button 76 corresponding by row in the array 72, or delete existing entries via an "x" button 78 also corresponding by row in the array 72. After verifying correctness of the information, the user can push a "learn" button 80 on the user interface 70 to apply the information in the array 72 as the reference table. In addition, the user can subsequently push a "refresh" button 82 for retrieving and populating the array 72 with more recent information as desirable.

During operation, one or more ring devices may be targeted for a change (or update), such as for upgrading a device, providing maintenance, addressing a malfunction, and so forth. Upon a change of one or more targeted ring devices 18, the active ring supervisor 18a may transmit and receive a second data collection frame 26" and compare the data structure 50 to an updated data structure 50' resulting from second data collection frame 26". For example, referring now to FIGS. 3 and 5A, a depiction of an updated data structure 50' is provided which lists each of the ring device 18. In comparing the data structure 50 to the updated data structure 50', the active ring supervisor 18a may determine that a same number of devices are in the ring and that a same ordering of devices are in the ring with only one targeted device 90 changed to a different device 92. Accordingly, the active ring supervisor 18a may reallocate the IP address 94, previously mapped to the targeted device 90, to the different devices 92.

In other words, if the data structure 50 and the updated data structure 50' are of the same size, with exactly "x" number of old devices having been removed and replaced with "x" number of new devices in same order, the active ring supervisor 18a can update the reference table 64 with new MAC addresses from the new participant list. When a DHCP request comes from the different device 92, the active ring supervisor 18a can reallocate the IP address to the new device.

However, if the data structure 50 and the updated data structure 50' are not of the same size, such as "x" number of old devices having been removed and replaced with "y" number of new devices, or if the data structure 50 and the updated data structure 50' are of the same size with "x" old devices replaced with "x" new devices but in different order, the active ring supervisor 18a may instead send an alert message warning the user, such as through the terminal device 16, that multiple devices have been replaced and/or reordered, and that the reference table 64 is incorrect. As such, IP addresses are not reallocated.

For example, referring now to FIGS. 3 and 5B, a depiction of an updated data structure 50" is provided which lists each of the ring device 18. In comparing the data structure 50 to the updated data structure 50", the active ring supervisor 18*a* may determine that a same number of devices are in the ring, but that some ring devices 95 and 96 have been reordered. Consequently, an alert message may be sent warning the user, and IP addresses are not reallocated.

In another example, referring now to FIGS. 3 and 5C, a depiction of an updated data structure 50' is provided which lists each of the ring device 18. In comparing the data structure 50 to the updated data structure 50''', the active ring supervisor 18*a* may determine that a different number of devices are in the ring, such as ring devices 98. Consequently, an alert message may be sent warning the user and without IP addresses being reallocated.

Figure 6:
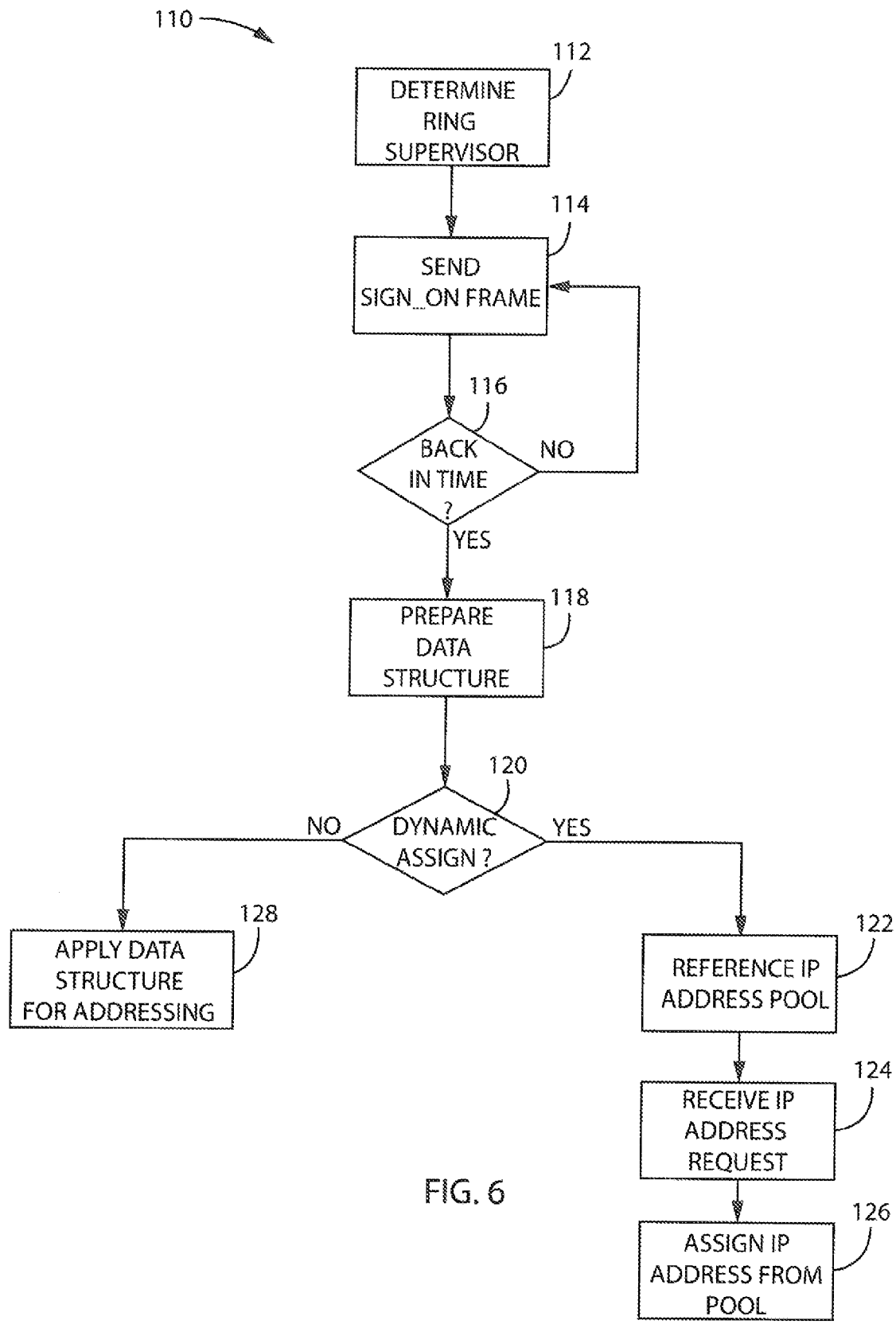
FIG. 6 is a flow chart illustrating a process for initial address assignment in accordance with an embodiment of the invention.

Referring now to FIG. 6, a flow chart illustrating an initial address assignment is provided at process 110 in accordance with an embodiment of the invention. In process block 112, an active ring supervisor is determined and the ring transitions to a normal, or closed, ring mode of operation. Next, in process block 114, the active ring supervisor sends out a Sign_On frame, data collection frame, which travels through the ring devices in order and collects participant's list information in the form of MAC and IP addresses of each device.

Next, in decision block 116, it is optionally determined if the Sign_On frame with the ordered participant information reaches back to the active ring supervisor within a predetermined amount of time. This essentially accounts for slower ring devices which might not have powered up or changed its internal state to a closed ring mode in time. If the Sign_On frame reaches back to the active ring supervisor within a predetermined amount of time, such as within 1 minute, in process block 118, a data structure listing each device on the ring in the order in which each device is connected, and indicating the MAC and IP addresses and/or other information for each device, is prepared. Otherwise, the decision block 116 returns to the process block 114 to send a subsequent Sign_On frame, in which case the earlier Sign_On frame is disregarded.

Next, in decision block 120, it is determined if a dynamic assignment scheme has been selected. If so, in process block 122, the active ring supervisor may reference a table or pool of predetermined IP addresses for allocating to ring devices in generating a reference table. Next in process block 124, the active ring supervisor may receive an IP address request from a ring device, such as a DHCP request, and in process block 126, the active ring supervisor may allocate an IP address to ring device accordingly. Alternatively, in process block 122, the active ring supervisor may immediately allocate an IP address to ring devices. Next, process block 126, the active ring supervisor may communicate allocated IP addresses to ring devices.

In decision block 120 if is determined that a dynamic assignment scheme has been not been selected, such as if static assignment has been selected instead, the process 110 continues to process block 128. Here, the active ring supervisor may maintain and apply the data structure for mapping devices on the ring to the static IP addresses for the devices. In other words, preconfigured addresses are used. If preconfigured addresses are unavailable the active ring supervisor may send an alert message.

Figure 7:
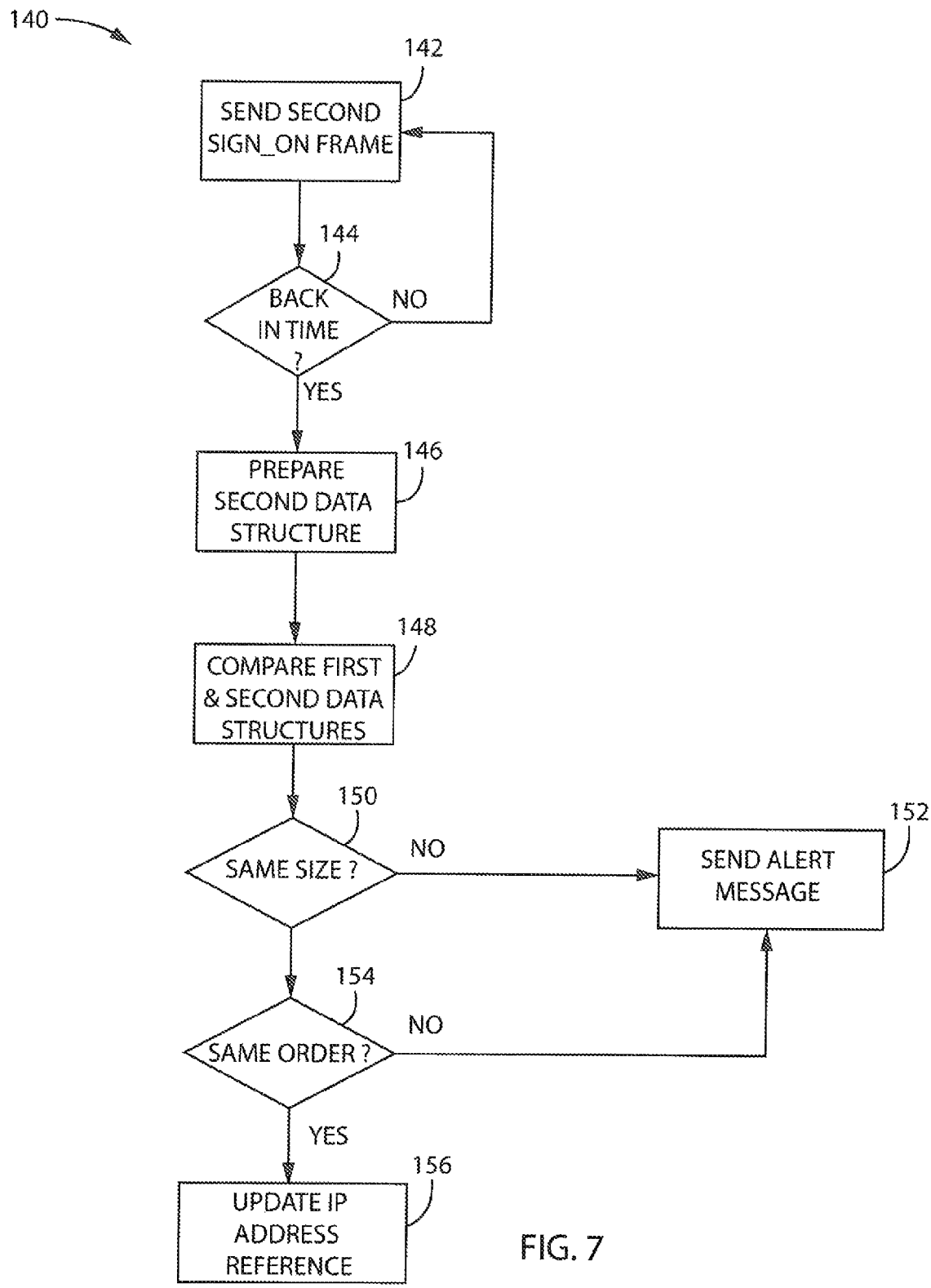
FIG. 7 is a flow chart illustrating a process for address assignment after device replacement in accordance with an embodiment of the invention.

Referring now to FIG. 7, a flow chart illustrating address assignment after device replacement is provided, at process 140 in accordance with an embodiment of the invention. In process block 142, upon a change of one or more targeted devices in the ring, the active ring supervisor transmits a second, subsequent Sign_On frame, or data collection frame, which travels through the ring devices in order and collects participant's list information in the form of MAC and IP addresses of each device.

Next, similar to decision block 116, in decision block 144, it is optionally determined if the Sign_On frame with the ordered participant information reaches back to the active ring supervisor within a predetermined amount of time. If the Sign_On frame reaches back to the active ring supervisor within a predetermined amount of time, such as within 1 minute, in process block 146, a second data structure listing each device on the ring in the order in which each device is connected, and indicating the MAC and IP addresses and/or other information for each device, is prepared. Otherwise, the decision block 144 returns to the process block 142 to send a subsequent Sign_On frame and earlier Sign_On frame is disregarded.

Next, in process block 148, the second data structure is compared to the earlier data structure. Next, in decision block 150, it is determined if a same number of devices are on the ring presently as compared to before. If there are a different number of devices on the ring, in process block 152 the active ring supervisor sends an alert message warning of the change, and previous IP address allocations, such as those provided in the reference table, are not reallocated. However, if there are a same number of device on the ring, the process 140 continues to decision block 154.

In decision block 154, it is determined if there is a same ordering of devices in the ring presently as compared to before with only the one or more targeted devices changed to one or more different devices. If the ordering has changed, in process block 152 the active ring supervisor sends an alert message warning of the change and previous address allocations, such as those provided in the reference table, are not reallocated. However, if the order has not changed, the process 140 continues to process block 156 in which the active ring supervisor reallocates IP addresses from the one or more targeted devices to the one or more different devices thereby updating the reference table. Decision blocks 150 and 154 may be completed in either order.

The technical effect of the invention is to reduce complexity for commissioning and/or replacing devices while retaining the advantages of a network ring topology.

Certain terminology is used herein for purposes of reference only, and thus is not intended to be limiting. Such terminology may include the words specifically mentioned above, derivatives thereof, and words of similar import. For example, the terms "first," "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A ring network comprising:
    a plurality of switching nodes providing Layer 2 functionality to forward data frames between ports, each switching node having at least a first and second port connectable to network media, the switching nodes arranged in a physical network ring wherein the first and second ports of each switching node connect to different switching nodes of the network ring and wherein at least one of the switching nodes is an active ring supervisor and the other switching nodes are ring devices, wherein the active ring supervisor executes to:
    (a) transmit a data collection frame out of one port for traversing the ring, wherein the data collection frame transmits through each ring device in an order in which they are connected, and wherein each ring device provides the respective ring device's MAC address to the active ring supervisor in response to the data collection frame; and
    (b) maintain a data structure listing each device on the ring, wherein the data structure indicates the order in which each device is connected on the ring, and wherein the data structure indicates the MAC address for each device.

2. The ring network of claim 1, wherein the active ring supervisor operates as a Dynamic Host Configuration Protocol (DHCP) server and allocates an IP address to each device on the ring.

3. The ring network of claim 2, wherein a plurality of predetermined IP addresses is provided for allocation.

4. The ring network of claim 3, wherein the predetermined IP addresses are in a sequential range.

5. The ring network of claim 2, wherein the active ring supervisor allocates an IP address to a device after the device makes a request.

6. The ring network of claim 2, wherein, upon a change of one or more targeted devices in the ring, the active ring supervisor transmits a second data collection frame and compares the data structure to an updated data structure resulting from the second data collection frame.

7. The ring network of claim 6, wherein, following the compare, upon determining a same number of devices in the ring and a same ordering of devices in the ring with only the one or more targeted devices changed to one or more different devices, the active ring supervisor reallocates each IP address from the one or more targeted devices to the one or more different devices.

8. The ring network of claim 6, wherein, following the compare, upon determining at least one of a different number of devices in the ring and a different ordering of devices in the ring, the active ring supervisor sends an alert message warning of the change.

9. The ring network of claim 1, wherein each ring device provides the MAC address in the data collection frame as the frame transmits through the ring device.

10. The ring network of claim 1, wherein the active ring supervisor maintains the data structure for mapping devices on the ring to static IP addresses for the devices.

11. The ring network of claim 1, wherein, upon failing to receive the data collection frame within a predetermined amount of time, the active ring supervisor transmits a second data collection frame.

12. An IEEE 802.3 Ethernet ring topology supervising network device for use with a ring network including a plurality of switching nodes providing Layer 2 functionality to forward data flames between ports, each switching node having at least a first and second port connectable to network media, the switching nodes arranged in a physical network ring wherein the first and second ports of each switching node connect to different switching nodes of the network ring, the supervising network device executing a stored program to:
    (a) transmit a data collection frame out of one port for traversing the ring, wherein the data collection frame transmits through each switching node on the ring in an order in which they are connected, and wherein each switching node provides the respective switching nodes MAC address to the supervising network device in response to the data collection frame; and
    (b) maintain a data structure listing each device on the ring, wherein the data structure indicates the order in which each device is connected on the ring, and wherein the data structure indicates the MAC address for each device.

13. The supervising network device of claim 12, wherein the supervising network device operates as a Dynamic Host Configuration Protocol (DHCP) server and executes to allocate an IP address to each device on the ring.

14. The supervising network device of claim 13, wherein, upon a change of one or more targeted switching nodes in the ring, the supervising network device transmits a second data collection frame and compares the data structure to an updated data structure resulting from the second data collection frame.

15. The supervising network device of claim 14, wherein, following the compare, upon determining a same number of switching nodes in the ring and a same ordering of switching nodes in the ring with only the one or more targeted switching nodes changed to one or more different switching nodes, the supervising network device reallocates each IP address from the one or more targeted switching nodes to the one or more different switching nodes.

16. The supervising network device of claim 14, wherein, following the compare, upon determining at least one of a different number of switching nodes in the ring and a different ordering of switching nodes in the ring, the supervising network device sends an alert message warning of the change.

17. A method for tracking a plurality of switching nodes providing Layer 2 functionality to forward data frames between ports, each switching node having at least a first and second port connectable to network media, the switching nodes arranged in a physical network ring wherein the first and second ports of each switching node connect to different switching nodes of the network ring and wherein at least one of the switching nodes is an active ring supervisor and the other switching nodes are ring devices, the method comprising:

(a) transmitting a data collection frame out of one port of the active ring supervisor for traversing the ring, wherein the data collection frame transmits through each device on the ring in an order in which they are connected, and wherein each device provides the respective device's MAC address to the active ring supervisor in response to the data collection frame; and (b) maintaining a data structure listing each device on the ring, wherein the data structure indicates the order in which each device is connected on the ring, and wherein the data structure indicates the MAC address for each device.

18. The method of claim 17, further comprising operating as a Dynamic Host Configuration Protocol (DHCP) server and allocating an IP address to each device on the ring.

19. The method of claim 18, wherein, upon changing one or more targeted devices in the ring, transmitting a second data collection frame and comparing the data structure to an updated data structure resulting from the second data collection frame.

20. The method of claim 19, wherein, following the comparing step, upon determining a same number of devices in the ring and a same ordering of devices in the ring with only the one or more targeted devices changed to one or more different devices, reallocating each IP address from the one or more targeted devices to the one or more different devices.

* * * * *